UNITED STATES PATENT OFFICE.

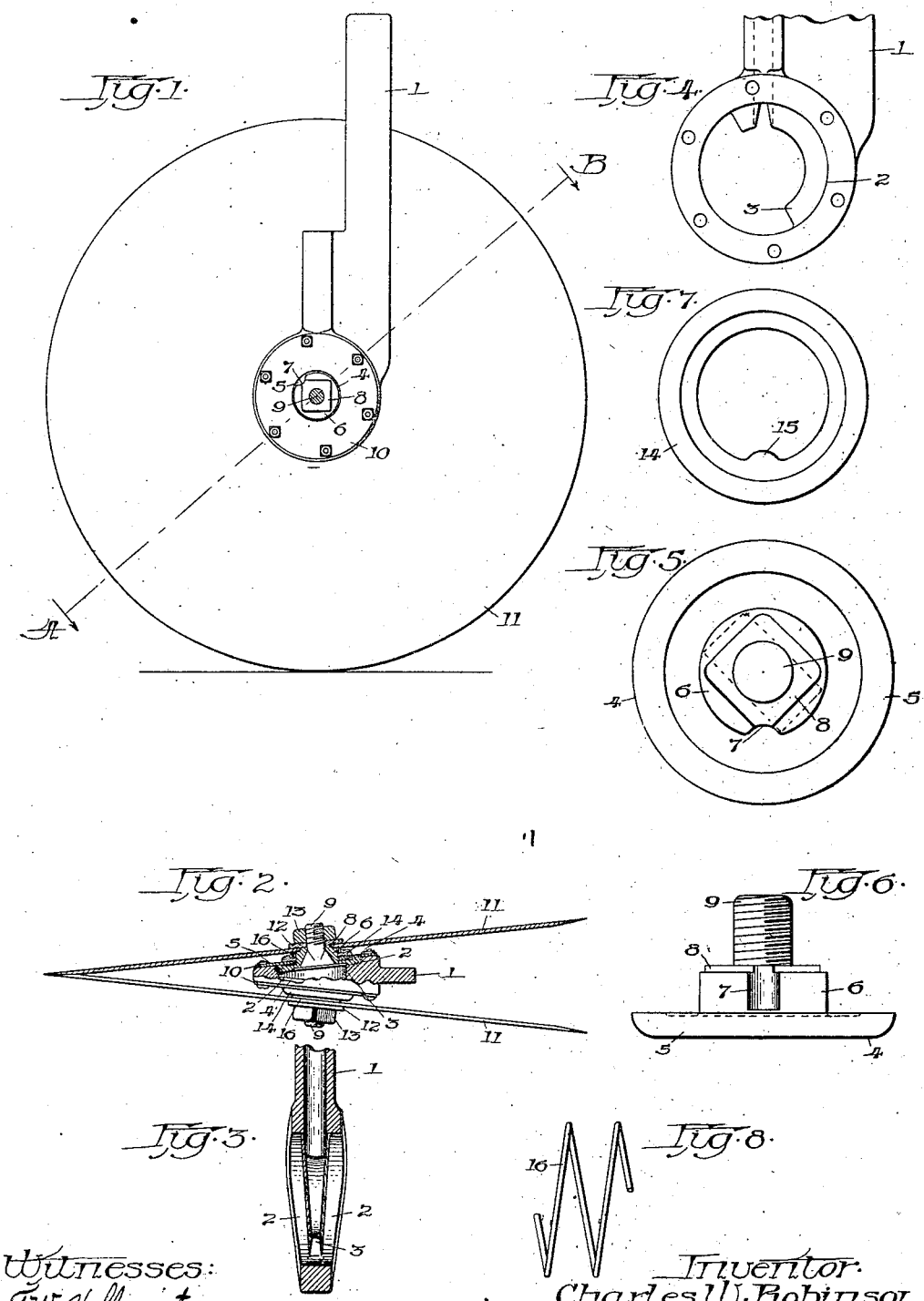

CHARLES W. ROBINSON, OF HAMILTON, ONTARIO, CANADA, ASSIGNOR TO INTERNATIONAL HARVESTER COMPANY, A CORPORATION OF NEW JERSEY.

DOUBLE DISK-BEARING FOR THE FURROW-OPENERS OF GRAIN-DRILLS.

1,008,068.  Specification of Letters Patent.  Patented Nov. 7, 1911.

Application filed December 17, 1910. Serial No. 597,959.

*To all whom it may concern:*

Be it known that I, CHARLES W. ROBINSON, a citizen of the United States, residing at Hamilton, in the county of Wentworth, Province of Ontario, Dominion of Canada, have invented certain new and useful Improvements in Double Disk-Bearings for the Furrow-Openers of Grain-Drills, of which the following is a specification.

My invention relates to grain drills in its general application and specifically to an improved journal bearing for use in connection with the double furrow opener mechanism as embodied in the construction of machines of the character indicated; the object of my invention being to provide a construction of bearing simple and strong, practical in its operation, readily assembled and efficient in operation. I attain these objects by means of the mechanism illustrated by the accompanying drawing, in which—

Figure 1 is a side elevation of a double disk furrow opener having one of the disks removed and having my invention embodied in the construction thereof; Fig. 2 is a sectional view of Fig. 1 along line A—B; Fig. 3 is an enlarged sectional detail of the lower end of the disk supporting bracket; Fig. 4 is a side elevation of Fig. 3; Fig. 5 is a plan view of one of the bearing blocks; Fig. 6 is a side elevation of Fig. 5; Fig. 7 is a plan view of a spring pressed dust excluding washer and showing the manner of mounting it upon the bearing block; and Fig. 8 represents one of the springs that is associated with the washer.

The same reference characters designate like parts throughout the several views.

1 represents a disk supporting bracket that may be attached to a drag bar in any approved manner. The bracket is provided at its lower end with circular surfaces that are inclined forward and downward at certain angles determined by the desired angle of inclination of the furrow opening disks, and 2 represents circular recesses upon opposite sides thereof that are separated by means of an interior flange 3 that partially surrounds the recesses at their rear sides, as shown in Fig. 4.

4 represents one of the bearing blocks having an enlarged circular base portion 5 adapted to be received by one of the recesses in a manner to rotate therein, a like bearing block being placed in the recess at the opposite side of the bracket. The bearing blocks are provided with a reduced portion 6 having a longitudinally arranged groove 7 upon its periphery, the reduced portion of the block terminating in a short angular portion 8, and 9 represents a common form of plow bolt that is received by an axial opening through the block and projects outward therefrom.

10 represents bearing plates secured to opposite sides of the bracket and having central openings therein that receive the reduced portions of the blocks, the plates engaging with the outer surfaces of the base members of the blocks in a manner to retain them in rotatable relation with the bracket.

11 represents the furrow opening disks that are provided with central angular openings adapted to receive the angular portions of the bearing blocks.

12 represent washers interposed between nuts 13 and the disks, whereby the bearing block is secured to the disk in a manner to rotate therewith.

14 represents a dust excluding washer having a central opening to receive the reduced portion 6 of the bearing block and adapted to move longitudinally thereon and provided with a radially projecting lip portion 15 adapted to be received by the groove 7 in a manner to cause the washers to rotate with the blocks, and 16 represents coiled compression springs interposed between the washers and inner face of the disks and operative to yieldingly press the washers against the bearing plates.

The disk supporting bracket is provided with a vertically arranged lubricant duct that communicates at its lower end with the interior of the recessed portion for the purpose of supplying lubricant to the bearings.

What I claim as my invention, and desire to secure by Letters Patent, is:

1. A journal bearing including, in combination, a supporting bracket having a forwardly and downwardly disposed surface surrounding an axially arranged recess formed in said surface, a bearing block having a circular base member rotatably received by said recess, and a circular reduced portion projecting laterally and axially from said base member, a bearing plate secured to the side of said bracket and engaging with the outer face of said base member in a manner to retain said bearing block in rotative relation with said bracket, said plate having a central opening that receives the reduced portion of said bearing block, said reduced portion terminating in a short angular portion, a rotatable element provided with an axial angular opening adapted to receive the angular portion of said bearing block, and means for securing said rotatable element to said bearing block.

2. A journal bearing including, in combination, a supporting bracket having a forwardly and downwardly disposed surface surrounding an axially arranged recess formed in said surface, a bearing block having a circular base member rotatably received by said recess, and a circular reduced portion projecting laterally and axially from said base member, a bearing plate secured to the side of said bracket and engaging with the outer face of said base member in a manner to retain said bearing block in rotative relation with said bracket, said plate having a central opening that receives the reduced portion of said bearing block, said reduced portion terminating in a short angular portion, a rotatable element provided with an axial angular opening adapted to receive the angular portion of said bearing block, means for securing said rotatable element to said bearing block, a washer mounted upon the reduced portion of said bearing block in a manner to rotate therewith, and a spring operative to press said washer in contact with said wearing plate.

CHARLES W. ROBINSON.

Witnesses:
    H. GOFF,
    JOHN E. BAINBRIDGE.